Oct. 6, 1959   M. A. GLEESON   2,907,448
SINGLE STRAND SUPPORTED ENDLESS BELT CONVEYOR
Filed Feb. 18, 1957   3 Sheets-Sheet 1

INVENTOR.
Murray A. Gleeson

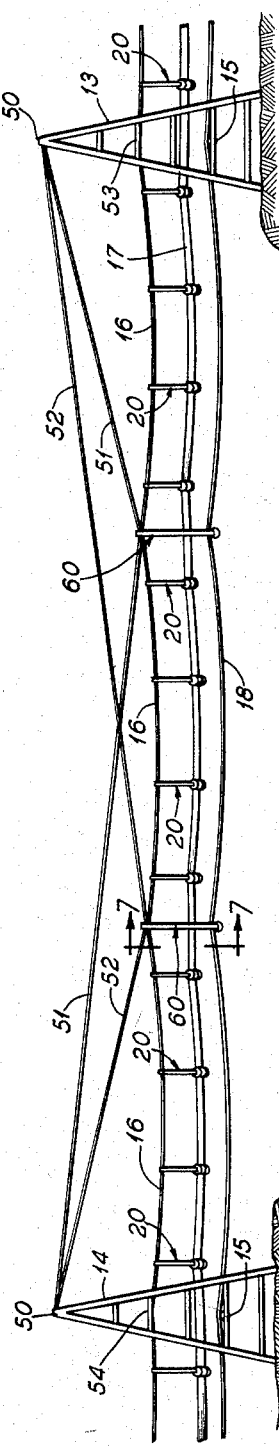

United States Patent Office 2,907,448
Patented Oct. 6, 1959

2,907,448

SINGLE STRAND SUPPORTED ENDLESS BELT CONVEYOR

Murray A. Gleeson, Downers Grove, Ill., assignor to Goodman Manufacturing Company, Chicago, Ill., a corporation of Illinois Application February 18, 1957, Serial No. 640,891

9 Claims. (Cl. 198—192)

This invention relates generally to belt conveyors and more particularly to an endless conveyor which can be supported upon a single strand.

Structure according to the present invention is characterized by what is effectively a single support strand for both the conveying and return reaches of an endless belt, the strand being maintained under a relatively high tension to minimize the catenary sag and having resilient hangers in pendent relationship therefrom for supporting the conveying reach, the resilient hangers absorbing impact loads from the conveying reach so that they are not transmitted into the support strand. The return reach is supported upon rigid hangers which are secured to the strand in a fashion so as not to be freely pendent, and so as to form a framing structure with the strand greatly to stiffen the same.

Depending upon the clear span of such conveyor, the flexible support strand may be part of a cable system which transfers both the dead and the live loads on the conveyor into support towers.

With the foregoing considerations in mind it is a principal object of this invention to provide an improved endless belt conveyor capable of spanning long unsupported distances, and characterized by a single support strand for both the loaded and return reaches of the belt.

Other objects and important features of the invention will be apparent from a study of the specification following taken with the drawings which together describe and illustrate a number of preferred embodiments of the invention and what are now considered to be the best mode of practicing the principles thereof. Other embodiments may be suggested to those having the benefit of the teachings herein, and such other embodiments are intended to be reserved especially as they fall within the scope and spirit of the subjoined claims.

Figure 1:
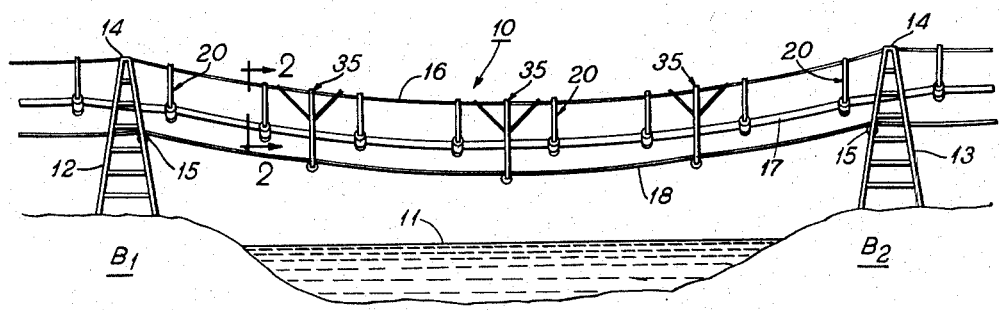
Fig. 1 is an elevational view of an endless belt conveyor supported upon a single strand, said conveyor having the improvements according to the present invention embodied therein.

Fig. 6 is an alternate embodiment of the invention where the conveyor is designed to span relatively long distances, and where a plurality of support strands occupying a common plane are employed for supporting both the conveying and return reaches of the endless belt; and Fig. 7 is an elevational view of one of the hangers for supporting the return reach of the conveyor seen in Fig. 6, said view being taken looking in the direction of the arrow 7—7 of Fig. 6.

Referring now particularly to Figs. 1 to 5 of the drawings, the improvements according to the present invention are embodied in an endless belt conveyor indicated generally by the reference numeral 10. The conveyor according ot the present invention is particularly adapted for use in the crossing of a stream or river 11 and includes a pair of spaced towers 12 and 13 disposed respectively on the banks $B_1$ and $B_2$ of the river 11.

Each of the towers is provided with a saddle 14 at the top thereof to guide a single flexible support strand 16 which spans the distance between the two towers 12 and 13. The support strand 16 forms a means of supporting and guiding a conveying reach 17 and a return reach 18 of an endless belt which is driven at a point remote from the towers 12 and 13 by any suitable prime mover, not shown. An idler roller 15 is provided at each tower 12 and 13 for support of the return reach 18 thereat.

Figure 2:
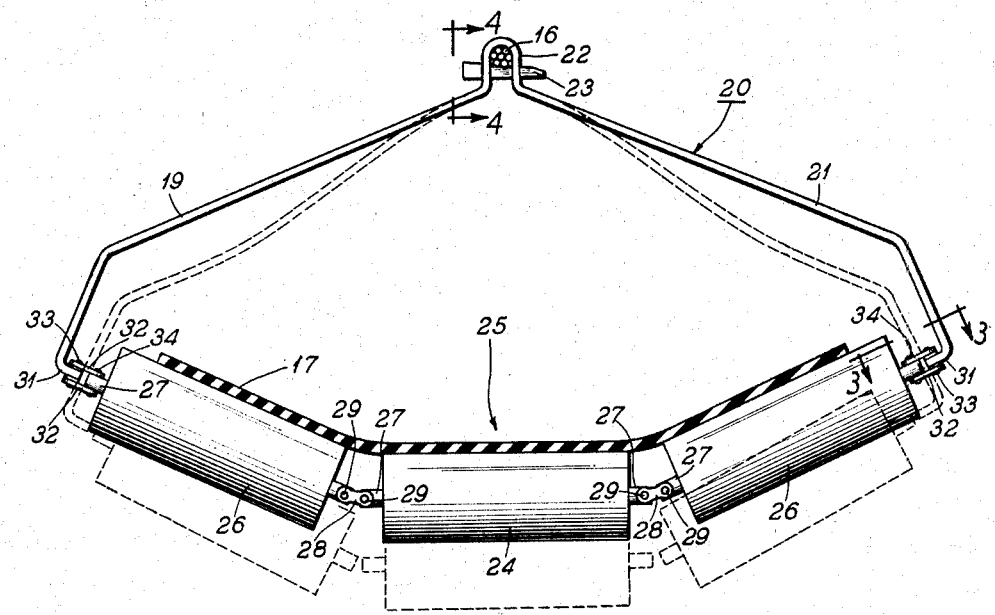
Fig. 2 is an elevational view of a resilient hanger for supporting the conveying reach of said conveyor from the single strand, said view being taken looking in the direction of the arrows 2—2 of Fig. 1.

A hanger assembly indicated generally by the reference numeral 20 depends from the support strand 16 and includes a pair of resilient arms 19 and 21 which are joined together at an inverted U-shaped bight 22 which overlies the strand 16 as seen in Fig. 2. The hanger 20 is held securely in place on the strand 16 by a securing means which includes the bight 22 and a drift pin or spike 23 which passes through openings 23a in each arm of the U-shaped bight 22 to clamp the strand 16 tightly in the bight 22.

A troughing roller assembly indicated generally by the reference numeral 25 is suspended from the lower ends of the resilient arms 19 and 21 and provides a support for the conveying reach 17. The troughing roller assembly 25 includes a center or load supporting roller 24 which is flanked by inclined troughing or wing rollers 26. Each of the rollers 24 and 26 is mounted to turn freely upon a dead shaft 27, and the rollers are connected for movement in a generally vertical plane with respect to each other by links 28 which flank the shafts 27 and which are pivotally connected to each shaft by pins 29.

The troughing roller assemblies 25 thus far described are arranged to span the distance between the lower ends of the flexible arms 19 and 21, and to move in a horizontal plane as a unit to correct any possible misalignment of the conveying reach 17. To this end the lower end of each one of the arms 19 and 21 has an inturned portion 31, and shackles 32, 32 are pivotally connected by a pin 33 at one end thereof to the inturned portion 31, and by a pin 34 to the outer end of the shaft 27 of each wing roller 26.

Figure 3:
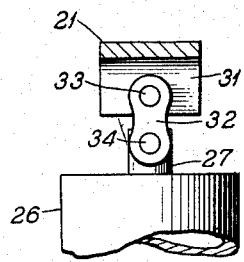
Fig. 3 is a detail fragmentary plan view showing a connection between a troughing roller assembly for the conveying reach of the conveyor seen in Fig. 1, said view being taken in the direction of the arrows 3—3 of Fig. 2.
Figure 4:
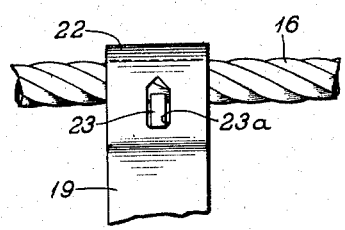
Fig. 4 is a detail elevational view showing means for securing the resilient hanger to the strand, said view being taken in the direction of the arrows 4—4 of Fig. 2.

As seen in Fig. 2 the springiness or elasticity of the arms 19 and 21 enables the troughing roller assembly 25 to be displaced downwardly to the dotted line position shown, for example, in accordance with the load on the conveying reach 17. As seen in Fig. 3, the shackles 32 enable the assembly troughing roller 25 to swing also in a horizontal plane to correct misalignment of the conveying reach 17. After the load passes, the resilient arms 19, 21 return to the solid line position.

The hanger assemblies 20 are secured in position upon the flexible strand 16, in the manner seen in Fig. 2, and spaced along the strand 16 for support of the conveying reach 17. As seen more clearly in Fig. 5 the return reach 18 is supported by a hanger assembly indicated generally by the reference numeral 35. Such hanger assemblies for the return reach 18 are disposed as seen in Fig. 1, there preferably being a pair of hangers 20 for the conveying reach 17 for each one of the hanger assemblies 35 for the return reach 18.

Referring now again to Fig. 5 of the drawings, the hanger 35 for the return reach includes securing means 36, 37 and 38 spaced along the support strand 16 for securing the hanger 35 to the support strand 16. The center securing means 37 includes a pair of diverging arms 39 and 41 which are coextensive respectively with vertically depending portions 42 and 43. The lower ends of the vertical portions 42 and 43 have extending therebetween a return idler roller 44 for supporting the return reach 18. A drift pin or spike 23 holds the securing means 37 to the strand 16.

Figure 5:
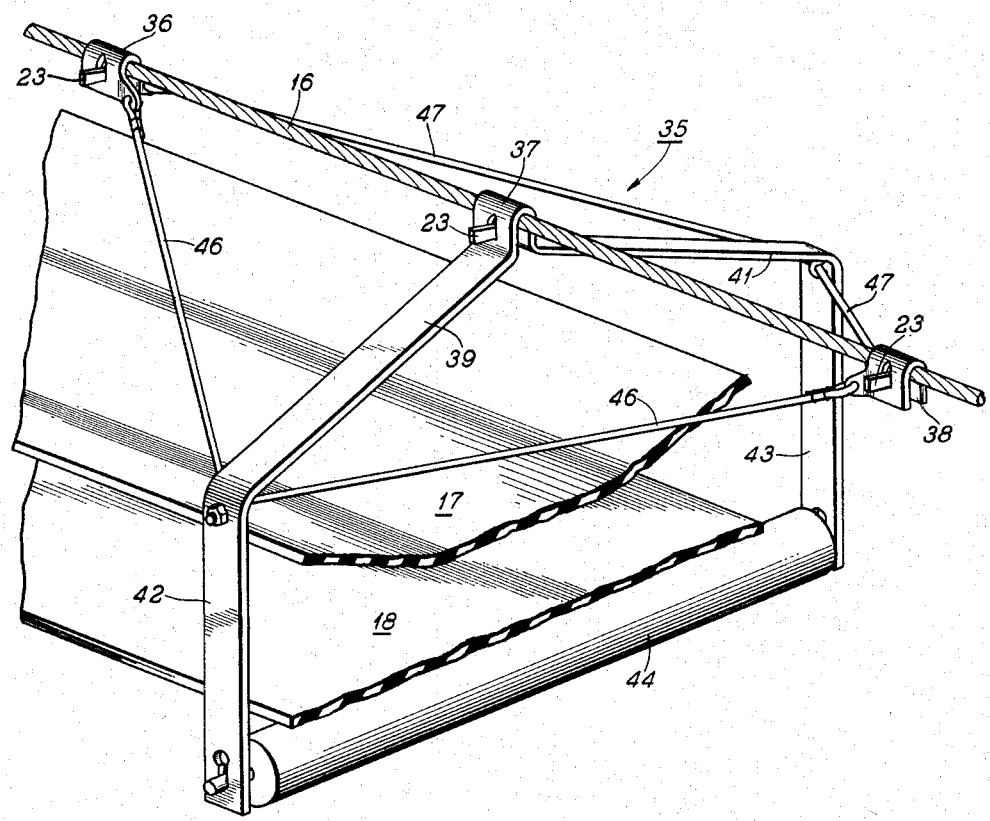
Fig. 5 is a perspective view of a hanger for supporting the return reach of the endless conveyor seen in Fig. 1.

The securing means 36 and 38 longitudinally spaced from the center securing means 37 are likewise secured along the strand by means of the drift pin or spike 23 as seen in Fig. 5. Each of the securing means 36 and 38 have bracing members 46 and 47 extending away from the securing means 36 and 38 to a point of juncture with the diverging arms 39 and 41 and their respective depending portions 42 and 43 so as to define a frame in space. The securing means 36, 37 and 38, together with the bracing members 46 and 47 and the diverging arms 39 and 41 effectively prevents swaying of the hanger 35 on the cable 16 in a plane including the strand 16. Furthermore, the spacing of the securing means 36, 37 and 38 effectively gives a certain amount of stiffness to the cable 16 to minimize the movement of the hangers 20 for the conveying reach 17.

Referring now to Figs. 6 and 7 of the drawings, there is shown another embodiment of the invention particularly adapted for long spans. As seen in Fig. 6 the towers 13 and 14 afford a means of anchoring auxiliary supporting cables 51 and 52 which are in co-planar relationship with the flexible strand 16. Strand 16 is anchored at 53 upon tower 13 and at 54 upon tower 14. The cables 51 and 52 are anchored at 50 at the towers 13 and 14.

Referring now to Fig. 7, cable 52 is guided through a bight 55 of a hanger assembly 60 for the return reach 18 with the strand 16 being clamped to the cable 52 by the action of the drift pin or spike 23. The bight 55 has arms 56 and 57 extending therefrom at right angles to the strands 52 and 16, and have respectively dependent therefrom portions 58 and 59, the lower extremities of which are arranged to support the return idler roller 44 of the same type as seen in Fig. 5. A stiffening gusset 61 may be provided between the arm 56 and pendant portion 58 and a similar gusset 62 between arm 57 and the pendant portion 59. The hanger 60 is held in position on the strands 52 and 16 by drift pin or spike 23 which passes through the limbs of the bight 55 in a manner like that shown in Fig. 4.

As seen in Fig. 6, the hanger assemblies 20 are provided at spaced intervals between the hanger assemblies 60 for supporting the conveying reach 17. It may be noted that the right hand hanger assembly 60 shown in Fig. 6 has cables 16 and 51 secured in the bight 55.

From the foregoing description it is believed evident that there has been provided some new and useful improvements in belt conveyors whereby both the conveying and return reaches can be supported by a single strand.

While the invention has been described in terms of a number of preferred embodiments thereof its scope is intended to be limited only by the claims here appended.

I claim as my invention:

1. In an endless conveyor, a single flexible support strand extending between spaced supports, a conveying reach and a return reach, means for supporting said conveying reach at intervals throughout its length comprising a hanger including securing means for securing said hanger to said support strand, laterally spaced resilient arms extending from said securing means, a flexible troughing roller assembly connected to said resilient arms, means for supporting said return reach comprising a hanger including a plurality of securing means spaced along said support strand for securing said last named hanger thereto, laterally spaced support arms extending downward from one of said last named securing means, a return roller for said return reach supported by said last named support arms, and bracing members extending from each of said last named support arms toward the other securing means spaced from said one securing means.

2. For use in an endless belt conveyor having a conveying reach and a return reach, supported by a single flexible support strand extending between spaced supports, means for supporting said conveying reach at intervals throughout its length comprising a hanger including securing means for securing said hanger to said support strand, laterally spaced resilient arms extending from said securing means, a flexible troughing roller assembly connected to said resilient arms, and means for supporting said return reach comprising a hanger including means secured on said support strand for securing said last named hanger thereto and preventing movement of said last named hanger in a plane including said support strand.

3. In an endless belt conveyor, a pair of spaced supports, a single flexible support strand extending between said supports, a conveying reach and a return reach, means for supporting said conveying reach at intervals throughout its length comprising a hanger including securing means for securing said hanger to said support strand, laterally spaced resilient arms extending from said securing means, a flexible troughing roller assembly connected to said resilient arms at the lower ends thereof, and means for supporting said return reach comprising idler rollers at said supports and a hanger including a plurality of securing means spaced along said flexible support strand for securing said last named hanger thereto, laterally spaced support arms extending downward from one of said last named securing means, a return roller for said return reach supported by said last named support arms, and bracing members extending from each support arm toward the other securing means spaced from said one securing means.

4. In an endless belt conveyor, a pair of spaced supports, a single flexible support strand extending between said supports, a plurality of auxiliary support cables extending between said supports in substantially coplanar relationship with said flexible support strand, a conveying reach and a return reach, means for supporting said conveying reach at intervals throughout its length comprising a hanger including securing means for securing said hanger to said support strand, laterally spaced resilient arms extending from said securing means, a flexible troughing roller assembly connected to said resilient arms, and means for supporting said return reach including a hanger having means for clamping said flexible support strand to one of said auxiliary support cables.

5. In an endless belt conveyor, a single flexible support strand extending between spaced supports, a conveying reach and a return reach, support means for supporting said conveying reach at intervals throughout its length comprising a hanger including securing means for securing said hanger to said support strand, resilient arms extending laterally and downward from said securing means, a flexible troughing roller assembly connected to said resilient arms, and support means for supporting said return reach comprising a hanger including means for clamping said last named hanger to said support strand, idler means supported by said last named hanger, said last named support means being disposed at greater intervals throughout the length of said support strand than the spacing of the support means for said conveying reach.

6. A hanger assembly for supporting a conveyor belt, said hanger assembly including securing means adapted to secure the hanger assembly to a flexible strand, spaced resilient arm portions depending from said securing means and a flexible troughing means carried by the arm portions.

7. A hanger assembly adapted to be secured to a single flexible supporting strand which extends between spaced supports for supporting a conveying reach of a conveyor belt therefrom, said hanger assembly having spaced resilient arm portions and a flexible troughing means including a plurality of interconnected roller elements extending between and carried by the arm portions.

8. In an endless conveyor having a single flexible strand extending between spaced supports, the improvement comprising, in combination with said strand, support means for supporting a conveying reach of a conveyor belt from the strand, said support means including a hanger assembly having a securing means for securing the hanger assembly to the strand, spaced resilient arm portions depending from the securing means and a flexible troughing means extending between and carried by the arm portions.

9. In an endless belt conveyor having a single flexible strand extending between spaced supports, the improvement comprising, in combination with said strand, means adapted to support a conveyor belt from said strand, said means including a first hanger assembly for supporting a conveying reach and a second hanger assembly for supporting a return reach of such belt, securing means for securing said hanger assemblies in longitudinally spaced relationship to each other along the strand, said first hanger assembly including laterally spaced resilient arm portions depending from the respective securing means and a flexible troughing means extending between and carried by the arm portions, said second hanger assembly including laterally spaced arm portions depending from the respective securing means and a return idler structure extending between and carried by the respective arm portions, and bracing means extending from the arm portions of the second hanger assembly to certain of said securing means, said certain securing means being longitudinally spaced along the strand from the securing means for the second hanger assembly.

References Cited in the file of this patent

UNITED STATES PATENTS

| | | |
|---|---|---|
| 735,301 | Robins | Aug. 4, 1903 |
| 2,776,044 | Lo Presti | Jan. 1, 1957 |